United States Patent [19]

Katz

[11] Patent Number: 4,845,739
[45] Date of Patent: *Jul. 4, 1989

[54] TELEPHONIC-INTERFACE STATISTICAL ANALYSIS SYSTEM

[75] Inventor: Ronald A. Katz, Los Angeles, Calif.
[73] Assignee: FDR Interactive Technologies, New York, N.Y.
[*] Notice: The portion of the term of this patent subsequent to Dec. 20, 2005, has been disclaimed.
[21] Appl. No.: 194,258
[22] Filed: May 16, 1988

Related U.S. Application Data

[63] Continuation-in-part of Ser. No. 18,244, Feb. 24, 1987, which is a continuation-in-part of Ser. No. 753,299, Jul. 10, 1985, abandoned.

[51] Int. Cl.$^4$ .......................................... H04M 11/06
[52] U.S. Cl. .......................................... 379/92; 379/93; 379/104; 379/105; 379/67
[58] Field of Search .......................... 379/91, 67, 92, 93, 379/104, 96, 103, 110; 235/377, 315

[56] References Cited

U.S. PATENT DOCUMENTS

| | | | |
|---|---|---|---|
| 3,393,272 | 7/1968 | Hanson | 379/67 |
| 3,934,095 | 1/1976 | Mathews et al. | 379/67 |
| 4,017,835 | 4/1977 | Randolph | 235/379 |
| 4,290,141 | 9/1981 | Anderson et al. | 455/2 |
| 4,320,256 | 3/1982 | Freeman | 379/92 |
| 4,345,315 | 8/1982 | Cadotte et al. | 364/900 |
| 4,355,207 | 10/1982 | Curtin | 379/67 |
| 4,355,372 | 10/1982 | Johnson et al. | 364/900 |
| 4,439,636 | 3/1984 | Newkirk et al. | 379/91 |
| 4,451,700 | 5/1984 | Kempner et al. | 379/88 |
| 4,489,438 | 12/1981 | Hughes | 381/51 |
| 4,521,643 | 6/1985 | Dupuis et al. | 379/92 |
| 4,523,055 | 6/1985 | Hohl et al. | 379/89 |
| 4,539,435 | 9/1985 | Eckmann | 379/93 |
| 4,559,415 | 12/1985 | Bernard et al. | 379/91 |
| 4,566,030 | 1/1981 | Nickerson | 358/84 |
| 4,578,700 | 3/1986 | Roberts et al. | 358/84 |
| 4,584,602 | 4/1986 | Nakagawa | 358/84 |
| 4,587,379 | 12/1986 | Masuda | 379/91 |
| 4,603,232 | 7/1986 | Kurland et al. | 379/92 |
| 4,625,276 | 11/1982 | Benton | 364/408 |
| 4,630,200 | 12/1982 | Ohmae et al. | 384/405 |
| 4,630,201 | 12/1986 | White | 364/408 |
| 4,634,809 | 1/1987 | Paulsson et al. | 379/91 |
| 4,654,482 | 3/1987 | DeAngelis | 379/95 |
| 4,674,044 | 6/1987 | Kalmus et al. | 364/408 |
| 4,696,029 | 9/1987 | Cohen | 379/92 |
| 4,697,282 | 9/1987 | Winter et al. | 379/67 |

FOREIGN PATENT DOCUMENTS 52-17740 2/1977 Japan .................................. 379/91

OTHER PUBLICATIONS

J. Svigals, "Low Cost Point-of-Sale Terminal", IBM Technical Disclosure Bulletin, vol. 24, No. 4, Sep., 1982.
Goran Erikson, et al., "Voice and Data Workstations and Services in the ISDN", 1984.
A. Turbat, "Telepayment and Electronic Money, the Smart Card", 1982.
V. Scott Borison, "Transaction—Telephone Gets the Facts at the Point of Sale", Bell Laboratories Record, vol. 53, No. 9, Oct. 1975.
M. Demeautis et al., "The TV 200, a Transactional Telephone".
"Voice Mail" Sound & Communications, vol. 28, No. 2, 8/83, pp. 84 and 85.

Primary Examiner—Robert Lev
Attorney, Agent, or Firm—Nilsson, Robbins, Dalgarn, Berliner, Carson & Wurst

[57] ABSTRACT

A system D interfaces with a multiplicity of individual terminals T1-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contents, lotteries, polls, commercials and so on.

41 Claims, 6 Drawing Sheets

FIG. 2

| CALLER'S TELEPHONE NUMBER AND INITIALS | DATA: AGE, WEIGHT---PULSE | CALL RECORD SEQUENCE | ASSIGNED DESIGNATION | ACKNOWLEDGE DIGITS |
|---|---|---|---|---|
| 627-2222-53 47 | 176........77 | 4951 | 4951/684 | 6173 |

| CARD TYPE | CARD # | CARD EXP. DATE | CUST. # | NAME ADDRESS DATA | ITEM 1 | COLOR SIZE CODE | ACKNOWLEDGE DIGITS |
|---|---|---|---|---|---|---|---|

| CALLER'S TELEPHONE NUMBER | USES/ MONTH | TIME | I.D. DATA | DESIGNATION | QUESTION ANSWERS |
|---|---|---|---|---|---|

201 — 202 — 204 — 206 — 208 — 210 — 200

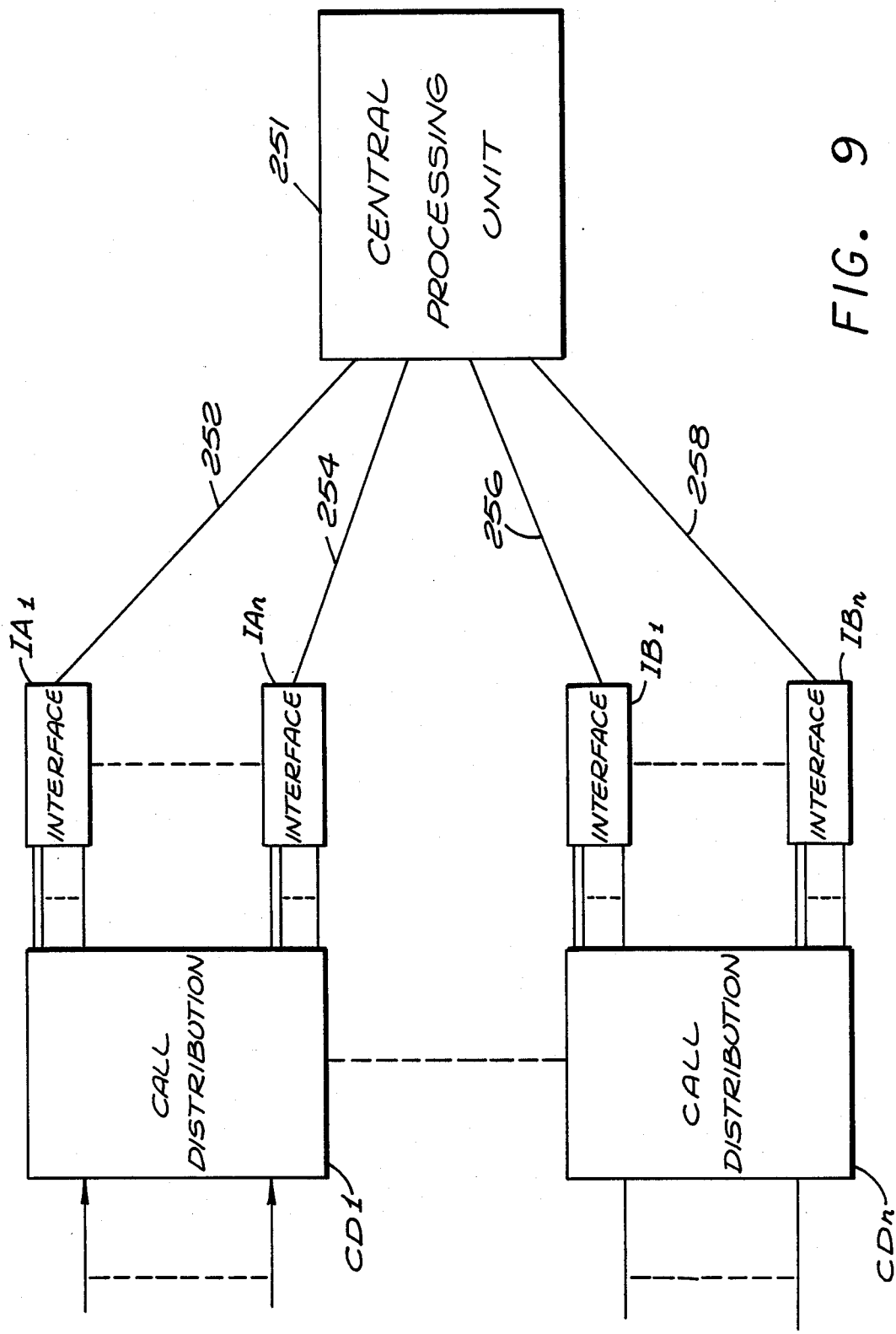

TELEPHONIC-INTERFACE STATISTICAL ANALYSIS SYSTEM

This is a continuation-in-part of application Ser. No. 018,244 filed Feb. 24, 1987, and entitled "Statistical Analysis System For Use With Public Communication Facility" which was a continuation-in-part of application Ser. No. 753,299 filed July 10, 1985 and entitled "Statistical Analysis For Use With Public Communication Facility" now abandoned.

BACKGROUND AND SUMMARY OF THE INVENTION

Various forms of publicly accessible communication systems for providing access to a central station have been proposed, some involving telecommunications. However, sometimes a need for ancillary functions arise in that regard, e.g. it may be desirable to positively identify a large group of persons, as a demographically controlled group, or a specifically entitled group, then statistically analyze data from the group so as to accurately identify certain persons in the group and select a subset of at least one person. Specifically, it may be desirable to obtain medical data from an entitled group of people, to correlate such data, perhaps introduce external data, then identify a select subset of the group. In that regard, a need exists for an improved, effective, economical, and expedient system of telecommunication incorporating means for performing qualification, identification, analysis and selection of individual persons.

It has been proposed to interface persons at telephone calling stations directly with a computer facility. In accordance with such arrangements, recorded voice messages prompt callers to provide data by actuating the alphanumeric buttons that are conventionally employed for dialing from one telephone station to another. In one prior arrangement, a caller may actuate dialing buttons to selectively attain a communication channel or to address specific information in a computer. In another arrangement, dialing buttons may be actuated to specify a billing designation as for requested services. Generally, such systems are believed to have been somewhat limited in scope, often involving difficulties that are frustrating or confusing to a caller. Nevertheless, such techniques have been widely used to enhance and broaden communication.

In general, the present invention comprises a telephonic-interface system and related process for selectively utilizing both analog (voice) and digital telephonic communication in a variety of different interface formats or programs, as to select or qualify a set of callers, enable positive identification of at least certain of the callers in the set, acquire data from callers in the set, statistically analyze acquired data, as in combination and in association with external data (time independent), and accordingly to isolate a subset of the callers with verifiable identification. That is, the external data (separate from caller-provided data) may be introduced at any of a variety of different times in relation to the caller data.

For example, a voice origination apparatus may prompt individual callers who (after qualification) provide select digital data to develop a record for further processing either immediately, upon the evolution of a defined set of callers or upon the establishment of select external data. Thus, following a qualification phase, the information acquisition phase may be concurrent or consecutive with respect to the processing phase. When appropriate, abort capability allows a caller to remain "off hook" and go to analog (vocal) communication. The caller then interfaces directly with an operator.

The system of the present invention may qualify an entitled set of callers, then receive answer data in the course of the call and develop identification or designation data, sequence data and statistical data. The system may then provide data cells for storing individual data while assigning confirmable identifications to the entitled set. From the set, a subset is defined. That is, in accordance with various formats, acquired data is processed in statistical relationship, or in relation to applied external data to accomplish such functional operating formats as an auction sale, a contest, a lottery, a poll, a merchandising operation, a game, and so on.

A variety of memory techniques are used to selectively activate the voice origination apparatus. Accordingly, statistical analysis and selection can be effectively and economically accomplished with respect to a substantial set of callers who are accommodated individual communication through a telephone system.

BRIEF DESCRIPTION OF THE DRAWINGS

In the drawings, which constitute a part of this specification, exemplary embodiments exhibiting various objectives and features hereof are set forth, specifically:

FIG. 2 is a fragmentary diagrammatic representation of a storage cell format as may be developed in the system of FIG. 1;

FIG. 5 is a fragmentary diagrammatic representation of a storage cell format as may be developed in the system of FIG. 1 with the processor of FIG. 4;

FIG. 7 is a diagrammatic representation of a storage cell format as may be developed in the system of FIG. 4.

FIG. 9 is a block diagram of the connections between the CPU and remote stations.

DESCRIPTION OF THE ILLUSTRATIVE EMBODIMENTS

As required, detailed illustrative embodiments of the present invention are disclosed herein. However, physical communication systems, data formats, and operating structures in accordance with the present invention may be embodied in a wide variety of forms, some of which may be quite different from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
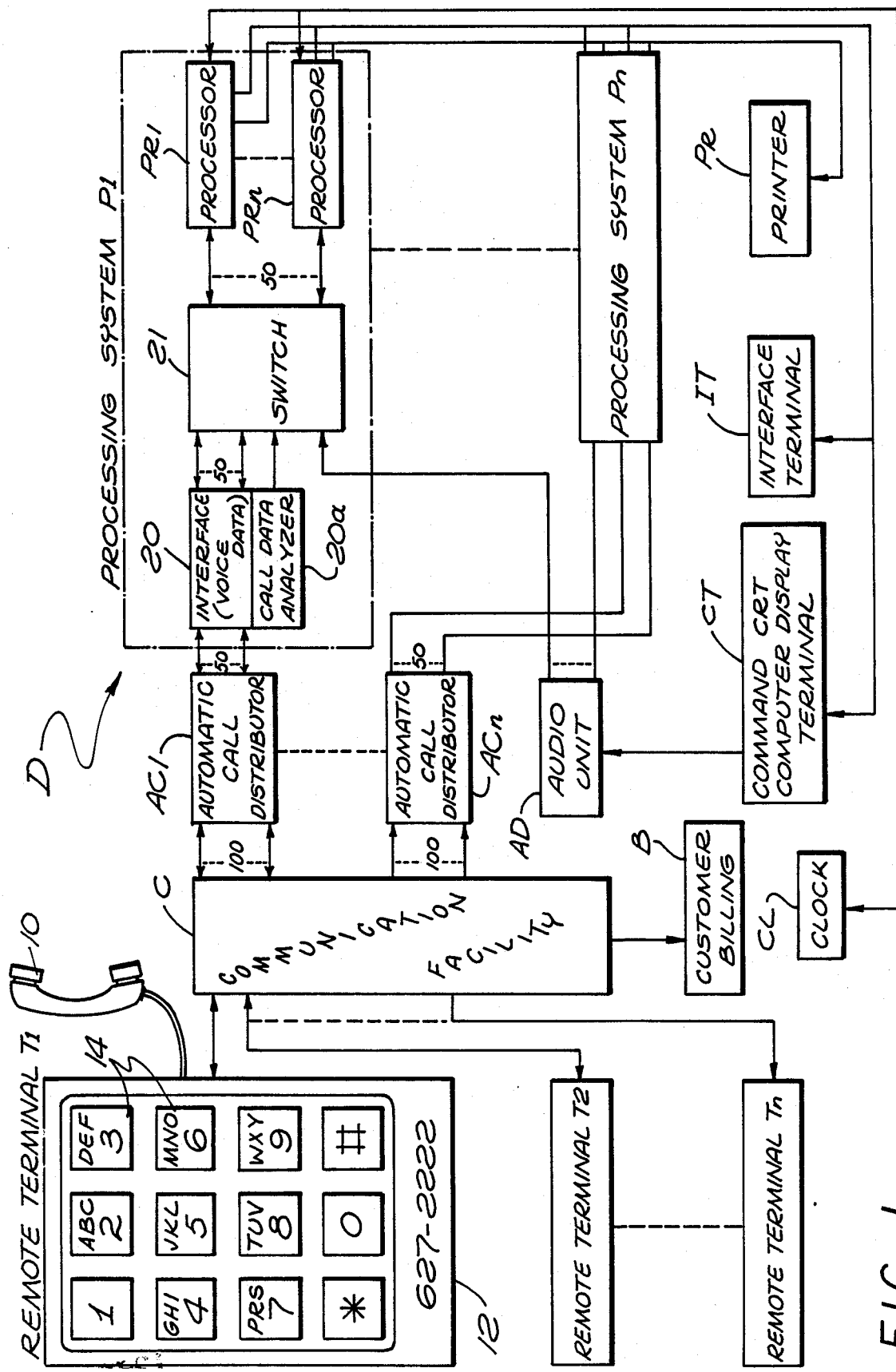
FIG. 1 is a block diagram of a system constructed in accordance with the present invention.

Referring initially to FIG. 1, a series of remote telephone-instrument terminals T1 through Tn are represented (left). The terminals are generally similar, and accordingly, only the terminal T1 is illustrated in detail.

In the disclosed embodiment, the remote terminals T1 through Tn represent the multitude of conventional telephone terminals that are coupled to a communication facility C which may take the form of a comprehensive public telephone system for interconnecting any associated terminals T1-Tn. In accordance with the present system, the terminals T1-Tn operate through the communication facility C to be coupled with a central station D, an embodiment of which is illustrated in some detail.

Generally in accordance with the present development, individual callers use the individual telephone stations T1 through Tn to interface the station D through the communication facility C. Callers may be screened or qualified. Also in accordance herewith, the data of individual callers may be collected, correlated and tested in the station D for processing in accordance with various programs and external data. As a consequence, various objectives are accomplished. For example, a select subset of the callers may be isolated and specifically identified, or related data may be processed, or transactions may be actuated. The possibilities for application of the system are substantial and varied as will be apparent from the exemplary structure and functions as described in detail below.

In one operating process format, the public might be polled with regard to locating the specific purchasers of a defective or dangerous product. Alternatively, the public might be polled with the objective of locating persons susceptible to a specific ailment or disease. Public auctions of unprecedented participation are possible. Legal lotteries are enabled that are interesting, effective and very economical on an individual participant basis. The system also might be employed in various game formats or to automate a promotion or mail-order operation, even to the extent of including inventory control as detailed below.

In each functional operating format, the callers may be variously qualified on the basis of entitlement and may be identified for subsequent verification. The callers then may be prompted, either through the interface or externally, to provide appropriate data.

Considering the system of FIG. 1 in somewhat greater detail, it is to be understood that the communication facility C has multiplexing capability for individually coupling the terminals T1-Tn to the central station D on request. In the illustrative embodiment of the system, the communication facility C comprises a public telephone network and the individual terminals T1-Tn take the various forms of existing traditional or conventional telephone instruments.

The exemplary telephone terminal T1 is represented in some detail to include a hand piece 10 (microphone and earphone) and a panel 12 provided with a rectangular array of push buttons 14 in the conventional configuration. Of course, the hand piece 10 accommodates analog signals while the panel 12 is a digital apparatus. Generally in accordance herewith, the hand piece 10 serves to manifest analog signals vocally to the caller.

In accordance with conventional telephone practice, alphabetic and numeric designations are provided on the buttons 14. For example, several of the buttons 14 carry three letters along with a decimal digit. Specifically, the button designated with the numeral "2" also carries the letters "A", "B" and "C". In that manner, the buttons 14 encompass the numerals "0-9", two symbols, and the alphabet except for the letters "Q" and "Z". Consequently, the buttons 14 accommodate the entry of decimal data, and to some extent alphabetic data.

The buttons 14 designated with symbols "*" and "#", along with the numeral "0", can be used by predetermined assignment to represent the letters "Q" and "Z" or any of a variety of other data or command components. Generally, in accordance herewith, the buttons 14 are employed to formulate digital data at the central station D in various formats determined by the instant specific use and operating format of the system.

Considering the central station D in somewhat greater detail, the communication facility C is coupled to interface a series of processing systems P1 through Pn (FIG. 1, left). Specifically, the communication facility C is connected to the processing systems P1-Pn through an associated series of automatic call distributors AC1 through ACn. Each of the automatic call distributors AC1-ACn accommodates one hundred lines from the communication facility C and accordingly, may accommodate and queue up to 100 calls.

Each of the automatic call distributors AC1-ACn may take various forms as well know in the prior art, functioning to queue incoming calls for connection to a lesser number of lines. In the disclosed embodiment, from each of the call distributors AC1-ACn, fifty lines are connected respectively to the individual data processing systems P1-Pn through an interface 20 and a switch 21. Thus, in the disclosed embodiment, each of the automatic call distributors AC1-ACn can accommodate one hundred lines, fifty of which may be active in association with one of the processing systems P.

The processing systems P1-Pn are similar, therefore, only the processing system P1 is shown in any detail. Collectively, the processing systems P1-Pn are interconnected with a command computer terminal CT, at least one interface terminal IT, at least one printer PR and an audio unit AD. The command terminal CT is separately coupled to the audio unit AD.

As represented, the processing systems P1 through Pn each contain a number of individual function units or processors PR1 through PRn. Although various other configurations and arrangements may be employed, the explanation is facilitated by including a plurality of individual function units as treated in detail below.

Considering the processing system P1, fifty lines from the automatic call distributor AC1 are connected to the interface 20, an exemplary form of which may be a commercially available Centrum 9000 unit. The interface 20 incorporates modems, tone decoders, switching mechanisms, DNIS and ANI capability (call data analyzer 20a) along with voice interface capability. Note that the interface may actually perform analysis on data. However, to preserve the disclosed embodiment manageable, major analysis is explained with reference to processors.

Generally, DNIS capability is a function of the communication facility C (composite telephone system) to provide called terminal digital data indicating the called number. ANI capability is a similar function whereby the digital data indicates the calling number with calling terminal digital signals. Both capabilities are available for use with equipment as the interface 20 and to provide control through the call data analyzer 20a.

Accommodating up to fifty independent calls on separate communication paths to the central station D, the interface 20 is capable of providing analog (voice)

signals to prompt each caller. Also accommodated are digital signals including the DNIS and ANI signals. The system contemplates the possibility of utilizing sequences of lines in rotary as well as blocking sequences of lines, the numbers for which command a particular program or operation format of a function unit as disclosed in detail below.

The interface 20 provides the connection of the fifty lines to a switch 21 which is in turn coupled to fifty function units, or processors PR1-PRn. As indicated above, multiple function units, or processors, are described in the disclosed embodiment to facilitate the explanation. Of course, non-parallel techniques and multiplexed operations might well be employed as alternatives. For a similar reason, as disclosed herein, each of the processors PR1-PRn includes memory cells for each of the callers' individual data. Development and compilation of data in such cells according to various operating formats is described below. In the disclosed embodiment, the processors PR1-PRn are connected collectively to the command computer terminal CT (incorporating a CRT display), the interface terminal IT, and the printer PR. Note that the CRT display serves to visually display data regarding select subsets as explained in detail below.

Exemplary detailed structures for the processors PR1-PRn are described below; however, in general, the units may comprise a microcomputer, for example, programmed as suggested above and as disclosed in detail below to accomplish specific operating formats. As an integral part of such formats, a caller may be qualified as belonging to an entitled set of persons or to accommodate specific demographic objectives. Also, callers may be designated both with respect to their significance and their identification. For example, callers may have different significance in a format, depending on the time or sequence of their call. Also, the designation of a caller may be exceedingly important in relation to the caller eventually being isolated as part of a subset, the members of whom must be accurately verified. As described below, the designations may involve multiple elements which may include: random number assignments, encryption techniques, utilization of calling numbers, identification data, sequence of call and so on to facilitate reliable verification. Note that the communication facility C has a customer billing structure B that is interfaced by the system.

On the qualification and designation of callers, the system enters a data accumulation phase during which digital data (formatted at one of the telephone terminals T1-Tn) is processed by one of the processors PR1-PRn. In general, the processing evolves a subset (at least one caller) the members of which may be verified and confirmed.

Either during the data accumulation phase, or after the processing phase to isolate a subset, a distinct operation may involve actuating the interface terminal T1 for direct local communication between the caller and an operator at the terminal T1. Another distinct operation may involve actuation of the printer PR to provide documents in relation to the operating format, as for providing award certificates as for verifying members of an isolated subset. Also, charge slips may be generated containing at least part of the data of a particular transaction.

An appreciation of the philosophical operation of a system in accordance with the present invention may now be enhanced by considering an exemplary operation of the illustrative embodiment of FIG. 1 to isolate a subset of people who are susceptible to a particular disease or infirmity. The exemplary operation might involve a geographical area, as a large city or population center, in which a particular health problem is somewhat acute. For example, a major population center might be polled where coronary artery disease is a significant problem. Accordingly, persons most susceptible to such disease could be identified for corrective recommendations.

People of the population center could be informed of the availability of a service for statistical health analysis. Accordingly, persons interested in their individual statistical situation would be motivated to utilize the service. Specifically, individual callers would use the remote terminals T1-Tn to contact the central station D through the communication facility C and thereby provide personal information that would enable a statistical analysis in relation to existing data so as to isolate and inform (either real time or batch basis) those persons statistically most likely to be in need of corrective measures. In such applications, it may be important that the caller's identity be subject to reliable verification. Other applications or programs also may present a critical need for positively verifiable identification to the extent that credit card numbers and/or personal identification numbers may be employed.

Figure 3:
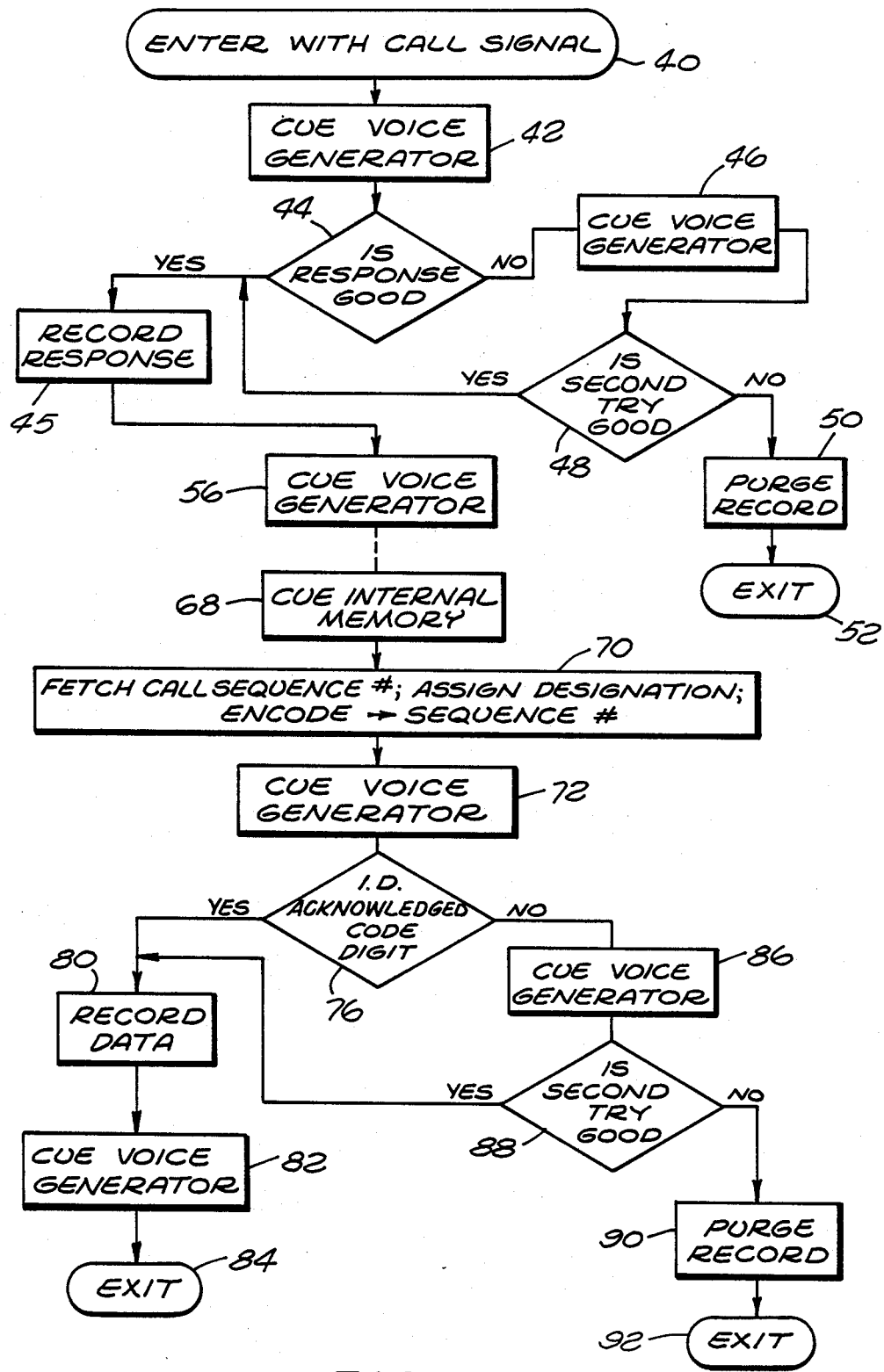
FIG. 3 is a flow diagram of one operating format of the system of FIG. 1.

An exemplary operation of the system, with regard to a specific caller, will now be treated referring somewhat concurrently to FIGS. 1, 2 and 3. As indicated above, FIG. 2 indicates a data storage format for a memory cell in an exemplary processor PR and now will be considered with regard to an operating format in which data is composed for a caller. Pursuing the above example, assume the existence of a caller at the remote terminal T1 (telephone number (213) 627-2222) who wishes to pursue health-related information on the basis of statistical analysis. The caller lifts the hand piece 10 and in accordance with conventional techniques actuates the push buttons 14 to call for a select operating format, e.g. telephone number (213) 627-3333 and thereby establish communication through the facility C with a designated function unit in the central station D. Receiving the call signal, the automatic call distributor AC1 associates the called number ((213) 627-3333, rendered available using standard telephone DNIS techniques) through the interface 20 and the switch 21 to attain connection with the specific processor, e.g. the processor PR1 formatting the health-related program. Accordingly, the processor PR1 cooperates with the interface 20 to cue the interface 20 to operate as a voice generator.

The sequence of operations is represented to be initiated in FIG. 3 by the "enter" block 40 which is accordingly followed by a "cue voice generator" command block 42. If the ANI equipment is not employed, the voice generator in the interface 20 formulates speech, a representative form of which might be: "Thank you for participating in the coronary artery disease statistical analysis. Please give us your telephone number by actuating the call buttons on your telephone instrument."

Acting on the instructions, the caller would push the buttons 14 in sequence to indicate his telephone number, e.g. "(213) 627-2222". Alternatively, the interface 20 can accept the calling number ((213) 627-2222) according to its provision by standard ANI equipment of the communication facility C.

The resulting data signals are communicated from the interface unit 20 (FIG. 1) to the processor PR1 for testing the telephone number as valid or entitled. Essentially, the format of a proper number prompts production of a valid or "good" signal. The test is indicated by the block 44 (FIG. 3). If the response is not valid or entitled, for example contains an inappropriate number of digits or has been used to a point of excess, the operation of block 46 is initiated again cuing the voice generator 30 (FIG. 1). The voice generator accordingly instructs the caller, e.g.: "You have not entered a proper telephone number. Please reenter your telephone number by pressing the appropriate call buttons." The caller is then allotted a predetermined period of time to make a proper entry with the consequence that the system moves to a test operation as indicated by the block 48 (FIG. 3). Specifically, block 48 poses the query: "Is the second try good?"

If the caller is again unsuccessful, the system purges the record as indicated by the block 50 and the call is terminated as indicated by the block 52. In an alternative mode, the processor PR1 may abort the interface and couple the interface terminal IT for direct personal communication with the caller. The interchange would then proceed, person-to-person.

If the caller responds with a proper telephone number, the operation proceeds. Specifically, the system sequences to record the response of the proper telephone number as indicated by the block 45. That is, the caller's telephone number is recorded in an assigned specific memory cell identified with the caller. The format of the cell C1 is indicated in FIG. 2. The first portion, section 53, contains a form of identification data, i.e., the caller's telephone number, i.e. "(213) 627-2222".

Note that as explained above, if the second attempt to formulate a proper number is successful, as manifest by the block 48 (FIG. 3), the response is recorded at that stage. In either case, exiting from the block 54 (FIG. 3) invokes the next operation of again queuing the voice generator as indicated by the block 56.

As an alternative format, if a selective-group polling operation is performed, or callers are otherwise to be cleared for entitlement as mentioned above, a caller may be qualified by providing a "one-time" key number. The processor PR1 may incorporate a look-up table for proper key numbers which numbers may be coded using any of a wide variety of techniques. As a simple illustrative example, the key may comprise a precise number of digits that always total a particular numerical value.

The system proceeds after the caller is qualified. Specifically, the cue to the voice generator of the interface 20 (FIG. 1) as represented by the block 56 produces a request for further information from the caller with further identification data and answer data. For example, the voice generator might request information by stating: "Please use the telephone buttons to indicate initials of your name."

The detailed operation is not represented in FIG. 3 as it is similar to the operation illustrated by the blocks 42 through 54. However, again, a proper response is registered in the storage cell C1 as illustrated in FIG. 2 by the number "53" also registered in the first section 53 of the cell.

The cycle of obtaining digital information from the caller next is repeated with respect to answer data, i.e. specific health data. For example, as illustrated in FIG. 2, the next section 58 in the cell C1 receives an accumulation of health data, including the caller's age, weight, . . . , pulse rate, and so on. Representative digital numbers are illustrated in FIG. 2.

During the course of the telephonic communication, the processor PR1 formulates identification data for the caller specifically including: the chronological sequence of the call, the assigned designation of the call, and a set of acknowledgment digits for the call. Such data identification is registered in the caller's assigned cell C1 in accordance with the format of FIG. 2 being stored in sections 62, 64 and 66. Note that the data may be stored in a coded interrelationship. For example, the acknowledgment digits may be related to the call record sequence. In the illustrative example, the chronological order number of the caller is 4951. The acknowledge digits may be derived from the sequence number. For example, as illustrated, a coded relationship may be established by adding "two" to each of the individual record sequence digits. Considering the example numerically:

|  | 4951 |
|---|---|
|  | 2222 |
| Adding without propagated carries: | 6173 |

Note that the confirmation data as acknowledgement digits can be extremely important, as to communicate with an isolated member of a subset. For example, identification could be published or circulated, as by a television broadcast, then respondents checked by use of confirmation data that may be confidential.

Continuing with the above example, the call chronological sequence registered for the caller is 4951 as represented in the section 62 while the acknowledge digits are 6173 as registered in the section 66. Additionally, the processor PR1 develops an assigned designation number, e.g. designation "4951684", which is registered in the section 64, the acknowledge code or digits, e.g. 6173, being registered in the section 66. These values are formulated in accordance with conventional number techniques during the data acquisition phase. With the exemplary numerals formulated, the operation proceeds.

The processor PR1 (FIG. 1) cues the internal memory. That operation is indicated by the block 68 (FIG. 3). Thus, the processor PR1 fetches the call record sequence number, assigns a designation (if not previously assigned), and encodes the sequence number as the acknowledgment digits (if not previously accomplished). These operations are indicated by the block 70 (FIG. 3).

Next, the processor PR1 (FIG. 1) cues the voice generator in the interface 20, as indicated by the block 72 (FIG. 3) to provide information to the caller. Specifically, for example, the voice generator in the interface 20 (FIG. 1) might signal: "This transaction has been designated by the number 4951684, and is further identified by the acknowledgment digits 6173. Please make a record of these numbers as they will be repeated. Specifically, the designation number is 4951684. The acknowledgment digits are 6173. Please acknowledge this transaction by pressing your telephone buttons to indicate the acknowledge digits 6173." In various applications as those involving security, the order and acknowledgment of callers may be very important. Therefore, data for confirmation associated with the order is important.

The system next proceeds to the test mode as indicated by the block 76 (FIG. 3). If the caller provides the correct acknowledgment digits, the data is confirmed in the record as indicated by the block 80 and is registered in the cell C1 (FIG. 2). Additionally, the voice generator is sequenced as indicated by the block 82 (FIG. 3) to indicate the close of the communication and that the transaction is terminated as represented by the exit block 84.

In the event that a caller cannot confirm his acknowledgment digits, as indicated by the block 76, a repeat operation is performed as indicated respectively by the blocks 86 and 88. Specifically, the voice generator is queued for a second instructional message. In the event that the second attempt also fails, the data is purged and the call discounted as indicated by block 90 and an exit block 92. If the second try is successful (test block 88), as indicated by the block 80, the record is perfected as indicated above.

As a result of the likelihood of a large number of calls, as described above, data cells in the processors PR1-PRn (FIG. 1) are developed with specific information indicative of a statistical sampling of the populace of concern. The data of that statistical sampling may be self-generating of specific conclusions with respect to a subset of individuals, and/or supplemental data to clearly manifest a significant subset. For example, the data may indicate a significant departure from an assumed normal characteristic. Such data, accumulated from the polling may be considered by logic comparisons in the computer 22 to select the subset of persons who should be isolated.

In addition to the self-generating conclusions available from the received data, the system may involve the introduction of external data. In the physical fitness example, such external data might take the form of national statistical data. In any event, the processing operation usually involves comparison testing which compares caller data from individual memory cells of the processors P1-Pn (FIG. 1) with test data that is supplied through the command terminal CT.

In the above example, members of the public in general were invited to use the service. A number of alternatives exist which might well impact on the statistical analysis. For example, a list may be preserved by a use-rate calculator to implement a consumable key operation. That is, a user is qualified to a specific limited number of uses during a defined interval.

As another example, callers might be restricted to the purchasers of a specific product as a medical apparatus for measuring blood pressures, heart rates, or so on. In such situations, it will be apparent that the statistical data will be somewhat distorted from an average or normal sampling. Clearly, the processors P1-Pn can be programmed to take into account such considerations. In that regard, the processors might also verify identification data proffered by a caller. Such data might take the form of a credit card number or a personal identification number. Methods for verification of such numbers using computer techniques are discussed below.

Figure 4:
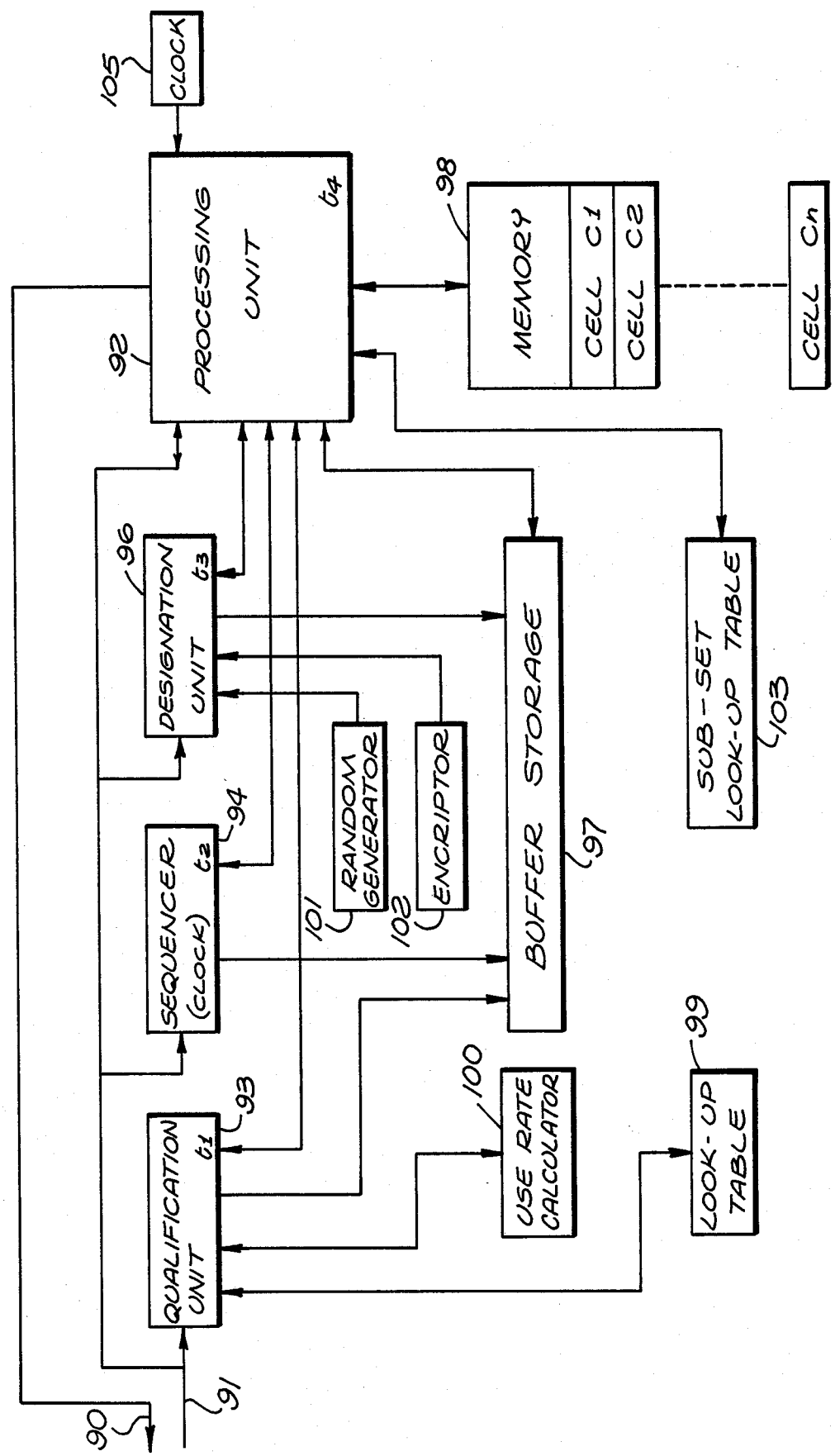
FIG. 4 is a block diagram of a form of processor or function unit as may be employed in the system of FIG. 1.

As indicated above and detailed below, the system can be programmed or formatted for use in a variety of applications. Preliminary to considering exemplary forms of such applications, reference will now be made to FIG. 4 showing an exemplary structural form for the processors PR1-PRn. From the switch 21 (FIG. 1) a pair of communication lines 90 and 91 are indicated in FIG. 4 (top left). The line 90 provides signals from a processing unit 92 while the line 91 provides signals to the processing unit 92 along with other components as represented in FIG. 4. The separate lines 90 and 92 facilitate explanation.

The processing unit 92 may take the form of a minicomputer programmed to accommodate the functions of various applications, as disclosed in detail below. As indicated above, the system may utilize a plurality of independent function units or processing units, e.g., processing unit 92, operating in a somewhat parallel configuration, or alternatively, a limited number of processors may be driven sequentially to accommodate the functional operations as described.

The input line 91 (upper left) is connected specifically to a qualification unit 93, a sequencer 94 and a designation unit 96, as well as the processing unit 92 as indicated above. The qualification unit qualifies access from a remote terminal T1-Tn to the processing unit 92 as described in detail below. In accordance with various applications or operating formats, the qualification unit 93, the sequencer 94 and the designation unit 96 operate preliminarily with respect to individual callers. Generally, these units qualify or test callers for entitlement, develop a sequence-of-calls record and provide forms of designations for callers that may be authenticated. As described in detail below, the units function in sequence to accomplish such operations and accordingly are each individually connected to the processing unit 92 and a buffer storage 97. Essentially, the buffer storage 97 is illustrated separately from the processing unit 92 along with the unit 93, sequencer 94, unit 96, and so on, again in order to facilitate the explanation. Similarly illustrated are a memory 98 (with cells C1-Cn), a look-up table 103 and a clock 105.

Considering the processor of FIG. 4 in further detail, the qualification unit 93 (upper left) is connected to a look-up table 99 and a use-rate calculator 100. The designation unit 96 (top center) is connected to a random number generator 101 and an encryptor 102.

In view of the above structural description of the system, consideration will now be given to certain specific applications in relation to the operation of the system. In that regard, the operation of the system will next be considered to automate a mail-order facility.

Assume that a caller at a terminal T1 (FIG. 1) dials a specific number to identify a mail order interface with the system of FIG. 1. For example, assume the telephone number "(213) 627-4444" for such an interface. Accordingly the caller dials the number at the remote terminal T1. As a result, the communication facility C couples the terminal T1 through the automatic call distributor AC1, the interface 20 and the switch 21 to a select processor PR1 identified and programmed for a mail-order operating format. Note that the communication facility C provides the dialed number ("(213) 627-4444") to the processing system P1 through well known telephonic equipment DNIS. Accordingly, a program is selected to execute the mail order interface.

As a preliminary action, a voice responder in the interface 20 might be cued by the processing unit to identify the mail-order house and indicate that the order will be taken by computer. Either before or after qualification, the caller might be advised that if he prefers to communicate directly with a person, or needs such contact at any point in the communication, he may accomplish it simply by pushing the asterisk button (*)

at the terminal T1. Such action forms an abort signal that is detected by the processing unit 92 to transfer the communication to the interface terminal IT (FIG. 1). Alternatively, the customer may be asked (by voice cue) to provide detailed information as name, address, etc. which is recorded for later processing.

After the preliminary information is supplied to a caller, the qualification phase is initiated. For example, the interface 20 might actuate the terminal T1 to announce: "Please indicate the type of credit card you will use for your purchase by pushing the button number 'one' for Mastercharge, 'two' for . . ."

The caller's response, indicating a specific credit card, will be stored in a data cell; however, the data is developed initially in the buffer 97. The format and data for the present example (in the buffer 97) will be explained with reference to a storage block format 104 as illustrated in FIG. 5. The first data block 130 accordingly registers a digit to indicate the card that will be used to support the caller's purchase.

Using voice prompt, the interface 20 next instructs the caller to use the telephone buttons to indicate his credit card number and the expiration date of the card. That data is stored in the register 104, specifically in the blocks 132 and 134 as illustrated in FIG. 5.

Next, the caller is asked for his customer number, as it may appear on his catalog. That number is stored in a block 136 of the block format register 104. Note that the caller may not be identified in the files of the mail-order house and in that event, the operation may be shifted to a manual operation to be continued through the interface terminal IT (FIG. 1) as explained above. For a television-initiated mail-order transaction, other numerical codes might be employed as to key into broadcast schedules. For example, a code might be used to indicate program times and thereby enable evaluation of the productivity of such program times. Such operation may be performed during the designation phase as described below.

To continue with the explanation of the automated format, assume that the customer has a file customer number and that it is stored in the block format register 104 along with his credit card number and expiration date. From that location, the data is checked by the qualification unit 93 (FIG. 4) for propriety as part of the test or qualification phase of operation. The check or test is in two stages and both are performed during an interval designated t1, the qualification unit 93 operating under control of the processing unit 92.

First, the data is verified as representing valid and proper data formats for the customer's number, the credit card number and expiration date. The second operation involves consulting a so-called negative list to assure that the identified card and customer's number have not been cancelled, as for example in the case of credit cards that have been lost or stolen. Detailed structure for such tests is described in the parent case from which this case continues and may be incorporated in the qualification unit 93.

With the successful completion and verification of the preliminary data in the block format register 104, the qualification phase of operation is concluded and the system next interfaces with the caller to acquire and process data for a specific order of merchandise. Note that in the mail-order operating format, the sequence of the call is not normally significant. However, the sequencer 94 may log the time during a period t2 if deemed worthwhile.

Somewhat as described above in relation to the initial operating format (health poll), the voice generator in the interface 20 prompts the caller through a series of exchanges that load the storage block format register 104 with a merchandise order. Thus, as purchase items are confirmed, the register 104 is loaded as exemplified by the blocks 140 and 142. The interchange continues until the customer indicates he does not wish to order any additional items. The system then operates the designation unit 96 (FIG. 4) during the interval t3 to develop and announce the acknowledgement digits as stored in the block 144 (FIG. 5). The acknowledgement digits serve to identify the order both for the caller and the mail-order house. Accordingly, tracing is facilitated. The data (FIG. 5) is then transferred from the buffer 97 (FIG. 4) to a select memory cell C1-Cn.

During the next interval t4, the processing unit 92 (FIG. 4) isolates data of the cells C1-Cn to facilitate the mail-order process. In that regard, the processor 92 may incorporate structure and processing techniques as disclosed in the parent case.

Of the wide variety of other operating formats and applications in accordance herewith, further examples will now be described with reference to the systems of FIGS. 1 and 4. However, from a consideration of the operating formats treated below, it will be apparent that certain structural elements have reoccurring significance in the combination. Specifically, such elements include the structures: (1) utilizing the called number to select a specific operating format, (2) for screening or selecting callers who will be accepted based on various criteria, (3) for designating callers in a manner to enable subsequent positive identification and (4) various processing aspects of the data manipulations including the provision of at least a portion of certain ID data provided directly from the telephone apparatus. With respect to the data processing, distinctive elemental features include the utilization of external data not available during the interval of gathering data, the utilization of an interrelationship between the composite data collected during a data acquisition period, and the operation of utilizing time or sequence of callers to accomplish a subset.

As the next illustrative operating format, an instant lottery system will be described. Accordingly, assume the existence of a legalized state lottery accommodated by the telephone system utilizing a pay-to-dial number ("(213) 976-xxxx") and restricted to a limited number of uses for defined intervals of time. For example, a person might be entitled to play the lottery a limited number of times or to the extent of a limited dollar value during a predetermined interval.

From the terminal T1 (FIG. 1) the caller would actuate the push buttons 14 to establish contact with the processing system P1 coupling would be through the communication facility C, the automatic call distributor AC1, the interface 20 and the switch 21 as described in detail above. The initial operation then involves qualification of the caller to participate in the instant winner lottery. Again, ANI or caller interface techniques may be employed. If the caller is involved, the interface 20 is actuated by the qualification unit 93 during the operating interval t1 to instruct the caller: "Please key in your telephone calling number". As indicated above, an alternative involves the system simply registering the calling number on the basis of its provision by ANI equipment.

In any event, after the caller's telephone number is registered, the instruction is given: "Participation in instant winner lottery is for persons over twenty-one years of age. Accordingly, please key in the year of your birth". A driver's license or credit card number may be similarly registered to confirm age. Alternatively, the combination of telephone number and date of birth could be used. In any event, the caller's data is registered and the qualification unit 93 then functions to test the data as provided. Specifically, the caller's telephone number is checked in a look-up table 99 to determine whether or not it is a proper and currently valid number for use in the lottery. Concurrently, the number is checked by the use-rate calculator to determine the number of times it has been used in excess of a predetermined number of calls or dollar value to participate in the lottery during a current interval of monitoring.

If the data indicates a qualified caller, the system proceeds to the next phase of designating the transaction. Note that the sequence is not significant in this operating format with the consequence that the interval t2 and the operation of the sequencer 94 may be bypassed. Rather, the designation unit 96 operates during the interval t3 to provide the caller with a designation for the current transaction and if applicable, updates the file as to current use or dollar value remaining for the caller's use. As explained above, the random generator 101 with or without the encryptor 102 may be employed to create an identification number which may include an encrypted form of the caller's telephone number. Accordingly, data for the transaction is established in the buffer 97 then set in a cell of the memory 98 (FIG. 4). Specifically, the completed data cell format might be as follows: Telephone No.—Birth Year—Designation—Random No.

The system next functions to generate the random number as indicated above which will then be tested against a series of other numbers to determine whether or not the caller is a winner. In that regard, elements in the processing unit 92 which accomplish the operation are illustrated in FIG. 6 which will now be considered in detail.

A random number generator 160 functions on command to provide a three-digit number. With the consummation of a call, the random number generator 160 is actuated to provide the caller's random number in a selected caller cell 162. From that location, the caller's random number is compared with numbers from a register 164 by a comparator 166. The numbers in the register 164 were previously passed through a gate 174 from the generator 160. In the event of coincidence, the comparator provides an output "yes" signal to a line 168. Conversely, the failure of coincidence prompts the comparator 166 to provide a "no" output to a line 170. Essentially, a "yes" indicates a win while a "no" indicates the caller has lost.

Figure 6:
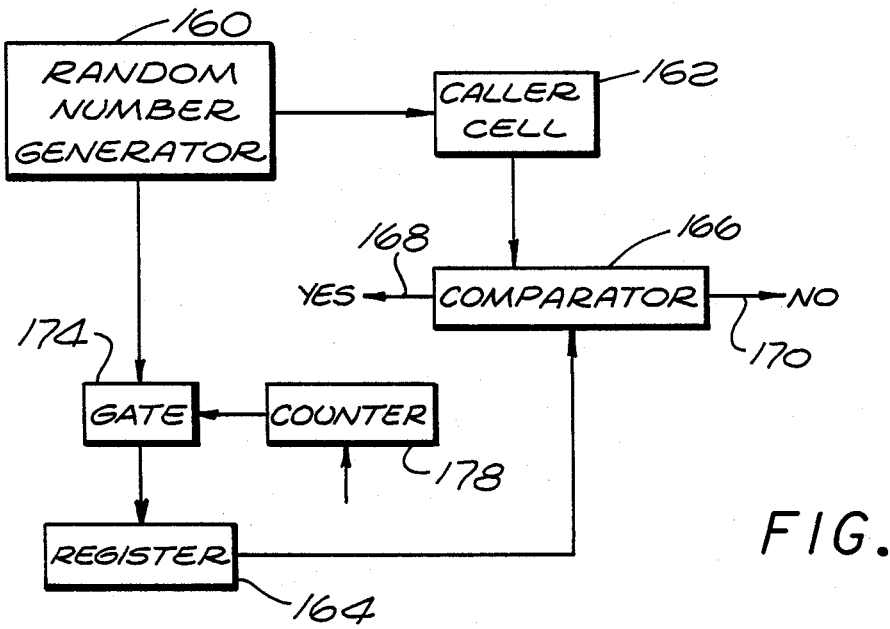
FIG. 6 is a block diagram of elements in an operating function unit of FIG. 4.

The elements of FIG. 6 provide a random operating format to determine winners on a somewhat statistical basis; however, the system increases the probability with the passage of time when no win occurs. In that regard, at the outset of an operating cycle, the random number generator 160 provides a random number that is passed through the gate 174 to the register 164. In the exemplary format, a three-digit number would be provided. At that stage, the caller's random number, from the cell 162, would be compared with the single number in the register 164 by the comparator 166. However, with the passage of time, calls are tallied or time is metered by a counter 178. Accordingly, upon the attainment of a predetermined count, the gate 174 is again qualified to enter another number in the register 164. Accordingly, an increasing set of numbers are held in the register 164 for comparison with each caller's number. Of course, the more numbers in the register 164, the higher probability of a caller winning and that relationship depends upon the duration or number of calls since the last winner.

Either a win or a loss as indicated within the processing unit 92 (FIG. 4) prompts the interface 20 to respond appropriately to the caller announcing his results. If there is a win, the designation may be reinforced and additional identification may be taken as explained above. Of course, if the prize simply involves a credit on the caller's telephone bill or his credit account, identification and designation become less critical considerations.

In the event of substantial awards to be claimed, the processing system P1 (FIG. 1) may actuate the printer PR to produce a positive identification of the winner, which document may be redeemed only by the caller providing the assigned designation along with confirmation of his identification data.

Generally in relation to awards, the processing unit 92 may also utilize a random number format for determining the significance of awards. That is, a random number may be actuated to provide numerals from one through twenty, for example, the magnitude of the number generated for a caller indicating the significance of his award. Normally such information would be provided to the caller and registered in his memory cell.

With respect to memory cells generally, it is to be noted that actuated memory cells may be cleared for callers who are not winners. Accordingly, a limited number of memory cells store the subset of winners for subsequent confirmation processing and so on.

As another operating process format in accordance with the present invention, consider an auction sale. As disclosed herein, the auction format is associated with television as, for example, in the form of a cable channel for dedicated use during an interval of an auction sale.

Preliminarily, in accordance with the disclosed exemplary format, persons wishing to participate in the auction sale would make preliminary arrangements involving utilization of the system to establish authorization data for qualified bidders in cells C1–Cn of the memory 98 (FIG. 4). In an alternative format, the bidders could simply be qualified immediately before bidding, as on the basis of a charge-card number or other identification.

Generally, it is contemplated that callers are coupled into the system only during the bidding on specific items of merchandise. Accordingly, some prequalification may be desirable to facilitate the rapid accumulation of a bidding group with the introduction of a unit of merchandise.

In accordance with the disclosed format, an auctioneer conducts the sale in a somewhat traditional manner, recognizing that he is interfacing a relatively large audience through the system of the present invention and with a television connection. Specifically, the auctioneer is cued as to audience reaction by a monitor incorporated in the command computer terminal CT (FIG. 1). Essentially, the auctioneer is given an abstract or summary of the relative bidding as the auction progresses. In one format, the caller sees the auction on a television receiver. That is, the monitor may be covered by a television camera to inform the audience and particularly interested bidders. Consider the detailed steps of the operation.

As the auctioneer announces the next item for sale, it is televised to potentially interested bidders. In addition to being informed of the merchandise, potential bidders might also be reminded of the telephone number for participating in the auction. Accordingly, any interested person at a remote terminal T1-Tn may dial the auction number and obtain access to the processing systems P1-Pn. The caller would have a television set available, tuned for example to a cable channel.

Any preliminary qualification as indicated above will then be performed along with any appropriate designation. With regard to the designation, unless callers are identified as part of the qualification step, the designation unit 96 (FIG. 4) assigns a limited-digit number to individual callers for use by the auctioneer interfacing the command computer and terminal CT. Further designation and sequencing as disclosed herein also constitute part of the process. To the extent that qualification and designation operations may be performed, the operations are performed as described above with reference to FIG. 4 by the qualification unit 93 and the designation unit 96. Of course, any of the safeguards and limitations as described herein may be employed as deemed appropriate for an auction format.

After the preliminaries, the auctioneer initiates the bidding with respect to a particular item that is observed by the callers on a television receiver as through a cable channel. Note that the audio may be variously coordinated through the telephone communication facility C and the audio channel of the caller's television. In a simple format, after an introductory phase, communication to callers with respect to the bidding is provided through the television link. Alternatively, the audio unit AD (FIG. 1) may be employed.

Essentially, the auctioneer initiates the bidding by stating an initial value for the opening bid. Callers are invited to bid by actuating the push buttons 14 (FIG. 1). For example, the auctioneer may invite an initial bid of one hundred dollars asking callers to so bid by entering an asterisk (*) by punching the button so designated. In accordance with one operting format, cells in the memory 98 (FIG. 4) are actuated to register the bidding number in identified relationship with several calls. Note that although a record may be desirable, it is not usually necessary to record all bids, particularly at initial bidding figures. In any event, the individual processing units, e.g. unit 92 in individual processors PR1PRn are interconnected (FIG. 1) and operate to select the final and key bids.

After attaining the initial bid, the auctioneer may invite further bidding by seeking a bid of two hundred dollars or any bid. Such a bid might be accomplished either by punching the asterisk button to attain th solicited bid, or by using number buttons to enter a different bid, e.g. two hundred fifty by buttons "2", "5" and "0". Again, cells of the memory 98 are actuated to record select bids (sequence) at the higher value.

The status of the bidding is presented to the auctioneer by the monitor of the command computer terminal CT (FIG. 1). Specifically, the auctioneer is provided an indication of the number of bidders at each level. If a sizeable number of callers bid at a specific value, the auctioneer may wish to advance the price significantly for the next round of bidding. Thus, the auctioneer proceeds until a small group of remaining callers are addressed. Note that the display of the command terminal CT (FIG. 1) may also inform the auctioneer of fresh bidders.

As the selection process proceeds, signals from the clock CL (FIG. 1) are introduced to indicate the sequence of bidders. For example, assume the bidding has proceeded to a stage where only three bidders remain active. The auctioneer is informed by the command terminal CT of the order in which the callers made their bids. The sequence is also of record in the cells of the memory 78 (FIG. 4) to indicate the sequence in the event that the final bid involves more than one caller. Of course, the first caller to respond with a bid would have priority in the purchase.

Normally at the conclusion of the bidding on a particular item, the contents of the cells in the memory 98 would be purged with only the final bidders being held in general memory within the processing unit 92. Of course, it is important to maintain a record of back-up bidders in the event the sale is not consummated with respect to the first of the highest bidders. That is, a subset of the highest bidders is preserved for each item of merchandise in the event that the highest bidder fails to qualify or the sale otherwise cannot be consummated. Of course, a distinct advantage of the system is the ability to accommodate a vast auction participation group for items of substantial value and as a consequence the distillation of a subset of callers is exceedingly valuable information.

To consider another operating format in association with the television media, a system will now be described whereby television viewers participate on a real-time basis in a game show for prizes. The ability to involve television viewers in a program has the potential of expanding program interest along with the expanded participation.

Game shows in accordance herewith may take any of a wide variety of forms as several well known programs in which studio contestants compete for prizes. In utilizing the system of the present invention to involve remote participants, it may be desirable to preliminarily qualify and designate callers as explained above. Specifically, prior to participating in an actual game show, interested participants interface the system as depicted in FIG. 1, and in the course of an exchange as described above, the qualification unit 93 and the designation unit 96 cooperate with the processing unit 92 to accomplish preliminary data on potential participants in cells of the memory 96.

Various games will involve different screening processes and clearances. For example, a child's television game format may require parental clearance and in that regard written communication may be required for approvals. Such approval may require the assignment of a personal identification number to the child player as qualifying identification data.

As explained above, clearances may be perfected through the look-up table 99 (FIG. 4) in association with the qualification unit 93 or approvals through a consumable key step may be extended to incorporate functions of the processing unit 92 in association with the memory 98. For example, if qualification simply involves a check-off operation, the look-up table 99 will normally be employed. However, in the case of preregistration for a participant, as in the case of the auction sale, the memory 98 is involved with the qualification unit 93 through the processing unit 92 to establish a data cell C1–Cn for each qualified participant. Thus, each potential participant to be qualified interfaces with the processing unit 92 during a preliminary interval of operation to provide data in one of the cells C1–CN to facilitate qualification for participation during a real-time game show.

At the time of the show, callers are qualified simply by reference to their assigned memory cell data for a verification. Thereafter, the caller's exchange information to supplement their data as with respect to the play which follows. Specifically for example, a caller might select a studio audience participant with whom the caller is to be allied. The interface operation may be essentially as described above wherein a voice generator in the interface 20 (FIG. 1) provides signals which activate the remote telephone unit to speak the instruction: "If you wish to play with Player No. 1, please push button No. 1; if you wish to play with Player No. 2, please push button No. 2 . . . . and so on". The caller may also be instructed to indicate the extent of a wager. For example, "Push the number button indicating the points you wish to risk".

The participant data is stored in an assigned cell of the memory 98 (FIG. 4) for the caller and as the game proceeds, the processing unit 92 tallies the caller's score. Scores are interrelated between individual processing units to actuate the terminal CT. Thus, individual accounting occurs for each of the calling participants on an on-line basis dependent upon the success of the studio players and their association with the callers. On-going accounting data may be provided at intervals or real time by the recorded voice to each contestant.

According to the described format, after an interval of play, the processing units, as the unit 92 (FIG. 4), operate to isolate a subset of caller-players who have amassed the highest scores. Of course, various arrangements may be provided for awarding prizes to the select subset of winning callers.

The above format involves a real-time game show with an on-line operating format. A somewhat similar format involves nonreal-time operation and in that sense, callers may interface with the system of the present invention before and after the show; however, not primarily during the show. Such a show might involve a quiz for callers based on their ability to perceive and remember occurrences within the show. Preregistration may be employed, however, is not essential. Rather, callers may call after the broadcast of a program. In that event, sequence or time clocking may be very important to limit or control individual interfaces to a specific time or geographic "window". That is, as suggested above, allocation-routing equipment and techniques may be employed in various of the formats to window callers. With the system, callers are screened or qualified at the time of a call, identified in a particular calling sequence, designated for identification and quiz answers are given for subsequent processing. Alternatively, players could participate by providing their credit card for billing or be billed through the "pay-to-dial" network. Consider an exemplary format.

A key to participation in the game show may involve the purchase of a particular product. For example, a person desiring to participate may purchase a product which carries a concealed key number. The number serves as a caller's key to participation in the game show.

In accordance with the disclosed operating format, after watching the broadcast of a television show (possibly a serial episode) the participant actuates the push buttons 14 at one of the remote terminals T1–Tn to accomplish an interface communication with the select operating format. For example, the caller may actuate the buttons 14 for the station number "277-7777" which identifies the game format of current description.

Assume responsive operation of the communication facility C to couple the caller through the automatic call distributor AC1 to the interface 20. Upon establishing a connection, the interface 20 receives the caller's telephone number through ANI equipment and a data cell in the memory 98 (FIG. 4) is assigned to the caller. Specifically, for example, associative coupling is provided for the caller through the switch 21 (FIG. 1) to the processor PR1 containing the memory 98 (FIG. 4) and a cell C2 assigned to the caller. A block format 200 is illustrated in FIG. 7 indicating the data that is developed in the cell C2. At the outset, the caller's telephone number is stored in a section 201 followed by uses/month in section 202.

Next, the caller is greeted and requested to give the key number entitling him to participate in the game show. The instruction constitutes an initial action to take place in an interval of qualification during the time t1. The caller actuates the buttons 14 providing digital representations to the qualification unit 93 (FIG. 4) and the look-up table 99 is consulted. Note that the table 99 may be a large, shared unit that tabulates each of the key numbers and accounts for their use. If the caller has identified a proper key number, the process proceeds and the key number is accounted, i.e. incremented or decremented to the limit of use if any. Alternatively, a repeat information operation may be requested as described in detail above.

As a further check during the qualification stage, the use-rate calculator 100 may function to determine whether or not an excessive number of calls have originated from the designated number. Thus, consideration involves calls or value with reference to a predetermined period of time. Again, a shared calculator may be used or addressing may obtain selectivity on the basis of calling numbers. If a large number of calls have originated from a single telephone terminal, a fraudulent situation may be suggested. Assuming no such indication occurs, the number of uses is registered in a section 200 (FIG. 7) and the operation proceeds from the interval t1 to interval t2.

During the interval t2, the sequencer 94 registers the precise time of the call in the buffer storage 97, specifically in a section 204 as illustrated in FIG. 7. With the entry of such data, the system passes from the operating interval t2 to t3.

The caller is next asked to identify himself in some specific manner. For example, the caller may simply be asked to provide the year of his birth. Alternatively, somewhat comprehensive information may be taken as in the form of drivers' license numbers, social security numbers and so on. Of course, such data may be employed for subsequent identification of the caller and, accordingly, is registered in the buffer storage 97 (FIG. 4). Specifically, identification information is registered in section 206 of the block 200 as shown in FIG. 7.

In addition to receiving identification information from a caller, the system assigns a designation to the caller. Specifically, the random number generator 101 (FIG. 4) provides a number which may be encrypted along with other identification data as the caller's personal identification to provide a numerical designation that is registered in the storage 97. Specifically, the designation is stored in a section 208 as illustrated in FIG. 7. With the designation operation complete, the interval t3 terminates initiating the data accumulation phase which occurs during an operating interval t4.

At this juncture, operating elements within the processing unit 92 will be considered in relation to an explanation of the manner in which select questions are provided to a caller and his answers received and recorded for subsequent processing to determine winners.

Figure 8:
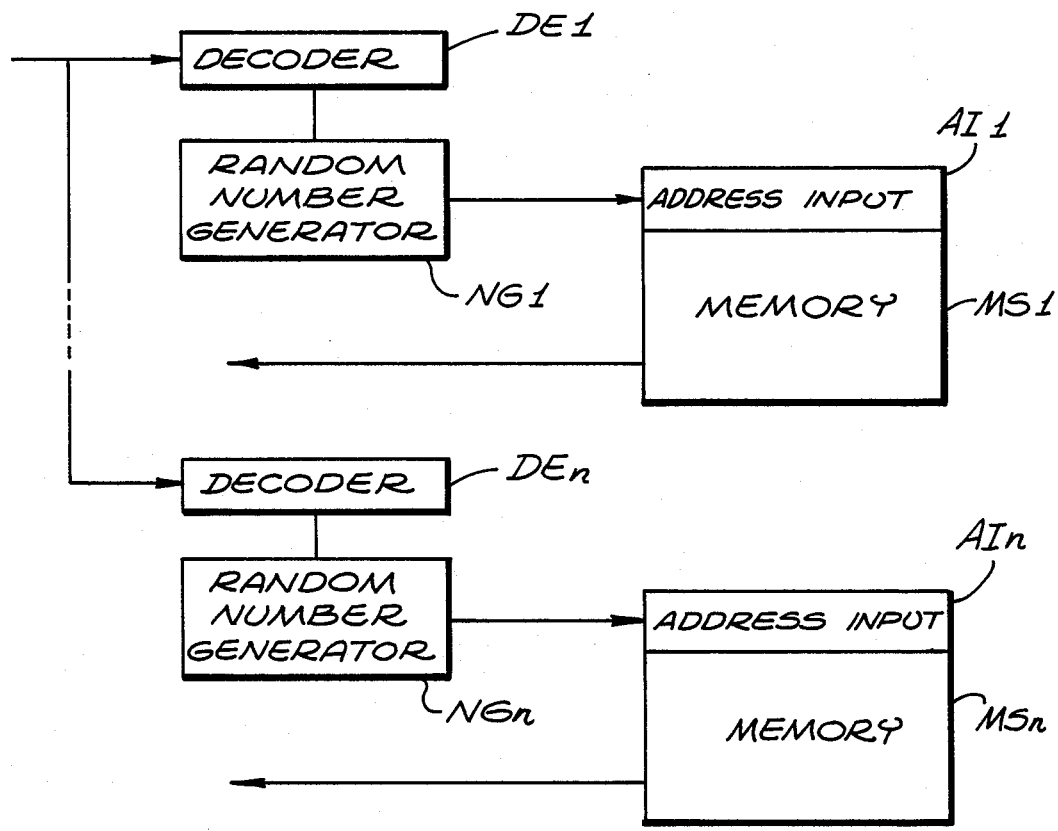
FIG. 8 is a block diagram of elements in an operating function unit of FIG. 4.

Preliminarily, reference will be made to FIG. 8 showing elements involved in the operating format which are contained in the processing unit 92 (FIG. 4) in association with the memory 98. To avoid confusion, the elements identified in FIG. 8 are designated by fresh numerals.

To accommodate the exemplary operating format, a dramatic program might be recorded preparatory to the television broadcast. A substantial number of questions would then be formulated based on the dramatic program. For example, "How many people were present when the will was read?"

It is contemplated that the dramatic program would be broadcast to different geographical segments of the country during different time intervals. To accommodate the different time intervals, it is proposed to utilize different questions for each geographic segment. That is, the basic format can remain the same, only the questions change by time zone to avoid study and collaboration on questions as a result of time shifts. A question propounded to a Chicago caller should not be repeated to a Los Angeles caller. In any event, callers might be given three questions randomly drawn from a pool serving one geographic segment and three questions drawn from a different pool serving another geographic segment.

The signals for prompting a voice generator are registered in memory sections MS1 through MSn. Each of the memory sections MS1–MSn is served by an address input AI1–AIn respectively. Similarly, the address inputs AI1–AIn are instructed by random number generators NG1–NGn, in turn actuated by decoders DE1DEn. Consider the operating sequence of the memory MS1 as an example.

The decoder DE1 is responsive to telephone calling numbers (provided by ANI equipment) indicative of a particular geographic area. Note, for example, that area code numbers afford an effective geographic classification of callers which is very useful in many formats or processes of statistical analysis in accordance herewith. Note that geographic (or other) classification in accordance herewith is also accomplished by the called numbers provided. Each of several television stations would solicit calls for different numbers as a result, either by DNIS or call channeling. Select processors would be reached through the interface units, e.g. interface 20 FIG. 1. In operation, the decoder DE1 determines a call is from a specific geographic area and accordingly provides a signal to actuate the random number generator NG1. As a consequence, the random number generator NGI provides a series of three random numbers in the form of addresses for the memory MS1. That is, the addresses may simply comprise three alphanumeric bits supplied to the address input AI1 to prompt the provision of three sets of voice generator signals for announcing the three questions in sequence. For example, the first question might be as suggested above: "Push the button on your telephone for the number of persons present in the room when the will was read".

The voice generator signals are supplied from the memory MS1 (within the processing unit 92, FIG. 4) to the interface 20 (FIG. 1) which generates audio signals to actuate the caller's hand piece 10. Accordingly, the caller is instructed to answer three questions, the responses being recorded in a section 210 of the data block 200 (FIG. 7). Note that the clock 105 (FIG. 4) may be utilized to limit the response period allowed each caller.

As indicated above, to accommodate broadcast of the program in a different time slot for a different geographic area, the decoder DEn (FIG. 8) actuates the random number generator NGn to address the memory MSn to provide three different questions as a result of a random selection. Accordingly, within a time or times (perhaps limited and offset) after the conclusion of the program, a substantial number of callers are accounted for in cells of the memory 98 and similar units of the composite system. The cells indicate sequences of calling and also may contain billing data where appropriate. That is, pay-to-dial operations avoid the need for billing, yet it may still be made of record.

Subsequent to the data accumulation phase of operation, the processing unit 92 (and its equivalents) is actuated during an off-line processing interval to isolate the subset of callers correctly responding to the questions. In accordance with one format, the subset of successful callers may be reduced to a subsubset as by a random computer "draw" to define a group of significant winners. That is, a random number generator may be employed as explained above.

As an alternative to subsequent processing, the system may inform callers of their success during the course of the interface telephone call. That is, callers might simply be informed by cuing the voice generator: "Your answers are correct and in accordance with the program game, you will now be entered in the sweepstakes draw for the prize . . ." Thus, the format defines a subset then further selects a sub-subset of winners. In any of the various formats, the status of the analysis can be televised by selecting a camera focused on the interface terminal IT.

Still another operating format for the system takes the form of polling operations to determine opinion or facts. An illustrative form of the format is disclosed below again in association with a television broadcast.

Generally, the illustrative polling format is contemplated in association with a television broadcast addressing a matter of current interest as, for example, a political issue or election. A master of ceremonies propounds questions to a viewing audience, many of whom are on-line through an interface of a system of the present invention. The master of ceremonies or commentator instructs the callers who are regulated and controlled by the system of the present invention to provide digital data which the system processes to inform the commentator as with regard to subsets of callers. For example, the commentator may be statistically informed as to the numbers of callers holding specific views. Consider a specific exemplary operating format.

Assume the existence of a system in accordance with the present invention installed for use in association with a television broadcasting facility. Of course, various previous arrangements could be involved; however, according to one arrangement a commentator simply invites members of the viewing audience to call a specific number and express their views with respect to a specific issue. Callers located at terminals T1–Tn (FIG. 1) activate the terminals to accomplish an interface with one of the processing systems P1–Pn as explained above. Note that the processor (or the interface 20 may involve operation of the qualification unit 93 (FIG. 4) to prevent callers from loading the poll. That is, to prevent multiple calls from a single terminal that would distort a poll, the qualification unit 93 registers calls in association with the use-rate calculator 100. Interfacing a specific processor, callers are screened by the qualification unit 93 (FIG. 4). In such a poll, it may be important to control the sampling group on a statistical basis. For example, it may be desirable to limit callers from each of several geographic areas. Accordingly, by the use of ANI equipment, the caller's telephone number is provided to the qualification unit 93 during the preliminary interval t1, and a determination is performed with regard to the number of involved callers from the geographic area using the look-up table 99. On attaining a full quota from a specific area, a subsequent caller may be informed that the lines are full. Alternatively, the caller may be requested to provide his telephone number for screening in the event ANI equipment is not available.

The caller may be requested to provide additional information so as to poll a balanced group. For example, a caller might be asked questions concerning age, political registration and so on by prompting the interface unit 20 to pose audio questions and testing the digital results through the qualification unit 93 as with reference to the look-up table 99.

As indicated above, in the event that the broadcast television program is one of a series, it may be desirable to limit the extent of participation over a period of several programs. Accordingly, the use-rate calculator 100 (FIG. 4) may be employed in association with the qualification unit 93. That is, if a calling number has participated in a prior poll, it may be denied access for a subsequent poll or its data not counted. Such operation would involve the use-rate calculator 100 in association with the qualification unit 93 performing logic tests to actuate the voice generator of the interface 20 for providing an appropriate interchange with a caller.

With the screening or qualification of a select group of callers, the sequencer 94 (FIG. 4) may or may not be involved to identify the order of callers. Also, the designation unit 96 may or may not be involved in view of the fact that for many polls there is little interest in subsequently identifying callers.

In the poll-format operation of the system, it is important to provide a capability of defining select intervals during which callers may provide data. In one arrangement, with the consummation of a communication interface between a caller and a processor unit, the audio of the television broadcast is keyed from the audio unit AD through the switch 21 (FIG. 1) for communication to the caller.

With a multiplicity of callers in interface relationship with the processors PR1–PRn as function units, a polling question is stated, for example: "If you favor expanded trade with . . . at the tone press button one; if you do not, press button two".

To control the interval of polling, the command computer terminal CT (FIG. 1) is actuated to enable the callers timely access to the processors.

At the expiration of a polling interval, the interfaces may be terminated or additional questions may be propounded. In any event, subsequent to the data-gathering phase, the bulk data is supplied to the command computer terminal CT incorporating computing facility to isolate subsets for communication by the broadcast. Accordingly, an effective on-line poll can be conducted with statistical sampling control and prompt display of responses.

As explained above, the arrangement of the function unit (or units) may be variously embodied in a single processor or many processors, depending on various considerations as time sharing, multiplexing, paralleling and so on. The systems as described above embody the components bulked together in one location. However, components of the system could be spaced apart geographically, using dedicated lines or polling techniques. An illustrative embodiment is shown in FIG. 9.

Call distributors CD1–CDn are at different geographic locations along with associated interface units IA1–IAn and IB1–IBn. Each of the interface units, as unit IA1 is coupled to a central processor 251 as indicated by lines 252, 254, 256 and 258. Each of the lines may take the form of a dedicated telephone line or a polling telephonic coupling.

In the operation of the system of FIG. 9, the call distributors CD are coupled to a telephonic communication system and accordingly allow the interface units I to provide interface communication between the central processing unit 251 and a multitude of remote terminals T1–Tn as illustrated in FIG. 1. With data accumulated in the cells, it may be variously down loaded as to a central processing station. Thus, the distributed-component system is capable of executing the various formats as explained above with reference to the illustrative structure.

In view of the above explanation of exemplary systems, it will be appreciated that other embodiments of the present invention may be employed in many applications to accumulate statistical data, process such data, and define subsets of callers of concern. While certain exemplary operations have been stated herein, and certain detailed structures have been disclosed, the appropriate scope hereof is deemed to be in accordance with the claims as set forth below.

What is claimed is:

1. A statistical analysis system for use with a communication facility including remote terminal apparatus for individual callers, wherein said remote terminal apparatus may comprise a conventional telephone instrument including voice communication means, and digital input means in the form of an array of alphabetic numeric buttons for providing identification and statistical data, said control system comprising:

interface means coupled to said communication facility to interface said terminal apparatus for voice and digital communication and including means to provide signal values from data developed by said terminal apparatus said interface means further including a consumable key test means to qualify callers with respect to limited use;

voice generator means coupled through said interface means for actuating said terminal apparatus as to provide vocal operating instructions to an individual caller; and means connected to said interface means for processing said statistical data as to isolate a subset of said individual callers.

2. A statistical analysis system for use with a communication facility including terminal apparatus for individual callers, wherein said terminal apparatus may comprise a conventional telephone instrument including voice communication means and digital input means in the form of an array of alphabetic numeric buttons for providing identification and statistical data, said control system comprising:

- interface means coupled to said communication facility to interface said terminal apparatus for voice and digital communication and including means to provide signals representative of identification and statistical data developed by said terminal apparatus;
- voice generator means coupled through said interface means for actuating said terminal apparatus as to provide vocal operating instructions to an individual caller;
- record means connected to said interface means for initiating a file and storing data relating to specific of said callers;
- means coupled to said interface means and said record means for assigning individual designations to callers and storing said designations in said record means, said designations including representations indicative of the calling order sequence of said individual callers; and
- means connected to said record means for processing statistical data as to identify a subset of said individual callers.

3. A statistical analysis system for use with a communication facility including terminal apparatus for individual callers, wherein said terminal apparatus may comprise a conventional telephone instrument including voice communication means, and digital input means in the form of an array of alphabetic numeric buttons for providing identification and statistical data, said control system comprising:

- interface means coupled to said communication facility to interface said terminal apparatus for voice and digital communication and including means to provide signals representative of identification and statistical data developed by said terminal apparatus;
- voice generator means coupled through said interface means for actuating said terminal apparatus as to provide vocal operating instructions to an individual caller; and
- manual terminal means for use by a person to communicate directly with at least one of said individual callers, said manual terminal means being coupled to said interface means and responsive to predetermined conditions to couple said manual terminal means to a caller terminal.

4. A system according to claim 3 further including means connected to said interface means for processing said statistical data as to isolate a subset of said individual callers and thereby actuate said manual terminal means.

5. A statistical analysis system for use with a communication facility including terminal apparatus for individual callers, wherein said terminal apparatus may comprise a conventional telephone instrument including voice communication means, and digital input means in the form of an array of alphabetic numeric buttons for providing identification and statistical data, said control system comprising:

- interface means coupled to said communication facility to interface said terminal apparatus for voice and digital communication and including means to provide signals representative of identification and statistical data developed by said terminal apparatus;
- voice generator means coupled through said interface means for actuating said terminal apparatus as to provide vocal operating instructions to an individual caller;
- record means connected to said interface means for initiating a file and storing identification data and statistical data for specific callers including data developed by said terminal apparatus;
- means coupled to said interface means and said record means for assigning individual designations to callers and storing said designations in said record means; and
- means for recalling data stored in said record means in response to said individual designations.

6. A statistical analysis system for use with a communication facility including terminal apparatus for individual callers, wherein said terminal apparatus may comprise a conventional telephone instrument including voice communication means, and digital input means in the form of an array of alphabetic numeric buttons for providing identification and statistical data, said control system comprising:

- interface means coupled to said communication facility to interface said terminal apparatus for voice and digital communication and including means to provide signals representative of identification and statistical data developed by said terminal apparatus;
- voice generator means coupled through said interface means for actuating said terminal apparatus as to provide vocal operating instructions to an individual caller;
- record means connected to said interface means for initiating a file and storing identification data and statistical data for specific callers including data developed by said terminal apparatus;
- means coupled to said interface means and said record means for assigning individual designations to callers and storing said designations in said record means, said designations including representations of the telephone number of the terminal apparatus used by a caller; and
- means connected to said record means for processing statistical data as to identify a subset of said individual callers.

7. A statistical analysis system for use with a communication facility including terminal apparatus for individual callers, wherein said terminal apparatus may comprise a conventional telephone instrument including voice communication means, and digital input means in the form of an array of alphabetic numeric buttons for providing identification and statistical data, said control system comprising:

- interface means coupled to said communication facility to interface said terminal apparatus for voice and digital communication and including means to provide signals representative of identification and statistical data developed by said terminal apparatus;
- voice generator means coupled through said interface means for actuating said terminal apparatus as to provide vocal operating instructions to an individual caller;
- record means connected to said interface means for initiating a file and storing identification data and statistical data for specific callers including data developed by said terminal apparatus; and means coupled to said interface means and said record means for assigning individual designations to callers and storing said designations in said record means, said designations including an encrypted representation of said data developed by said terminal apparatus.

8. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data and wherein said facility may provide calling terminal digital signals to a called station representative of a remote calling terminal, said control system comprising:

interface structure coupled to said communication facility to interface said terminal apparatus for voice and digital communication and including means to provide signal values from signals representative of data developed by said terminal apparatus;

voice generator means coupled through said interface means for actuating said terminal apparatus as to provide vocal operating instructions to an individual caller;

analysis means connected for processing data from a plurality of callers in combination to isolate a select subset of said callers by interrelated processing; and call data analyzer structure for modifying said data from a plurality of callers under control of said terminal digital signals.

9. A control system according to claim 8 further including record means connected to said interface means for initiating a file and storing said terminal digital signals as identification at least in part for a caller.

10. A control system according to claim 8 further including switch means whereby passage of said data from a plurality of callers to said analysis means is controlled by said terminal digital signals.

11. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data and wherein said facility may provide called terminal digital signals to a called station representative of the called station, said control system comprising:

interface means coupled to said communication facility to interface said terminal apparatus for voice and digital communication and including means to provide signal values from signals representative of data developed by said terminal apparatus;

voice generator means coupled through said interface means for actuating said terminal apparatus as to provide vocal operating instructions to an individual caller;

analysis means connected to said record means for processing said statistical data from a plurality of callers in combination and in accordance with a plurality of distinct formats to isolate a select subset of said callers by interrelated processing; and means for actuating one of said distinct formats in accordance with said called terminal digital signals.

12. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:

coupling structure including a plurality of interface units each capable of accommodating a plurality of communication paths coupled to said communication facility to interface said terminal apparatus for voice and digital communication and including means to provide signal values from signals representative of data developed by said terminal apparatus;

voice generator means in said interface means coupled for actuating said terminal apparatus as to provide vocal operating instructions to an individual caller;

record means connected to said interface means for initiating a file and storing identification data and statistical digital data for specific callers including data developed by said terminal apparatus; and analysis means connected to said record means for processing said statistical data from a plurality of callers in combination to isolate a select subset of said callers by interrelated processing.

13. A system according to claim 12 further including means for queuing said remote stations to said coupling means whereas to sequence interface communications.

14. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:

interface structure coupled to said communication facility to interface said terminal apparatus for voice and digital communication and including means to provide signal values from signals representative of data developed by said terminal apparatus;

voice generator means coupled through said interface means for actuating said terminal apparatus as to provide vocal operating instructions to an individual caller;

analysis means connected for processing data from a plurality of callers in combination to isolate a select subset of said callers by interrelated processing; and qualification means for qualifying access from said remote terminal apparatus to said analysis means.

15. A system according to claim 14 wherein said qualification means comprises means for limiting access from a remote terminal to said analysis means on the basis of accesses per interval of time.

16. A system according to claim 14 wherein said qualification means comprises means for limiting access from a remote terminal to said analysis means under control of said signals representative of data developed by said terminal apparatus.

17. A system according to claim 16 wherein said qualification means includes a look-up table.

18. A system according to claim 16 wherein said qualification means includes a use-rate calculator.

19. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:
  interface structure coupled to said communication facility to interface said terminal apparatus for voice and digital communication and including means to provide signal values from signals representative of data developed by said terminal apparatus;
  voice generator means coupled through said interface means for actuating said terminal apparatus as to provide vocal operating instructions to an individual caller; and
  analysis means connected for processing data from a plurality of callers in combination to isolate a select subset of said callers by interrelated processing including a display structure for visually displaying data regarding said select subset.

20. A system according to claim 19 further including a printer.

21. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:
  interface structure coupled to said communication facility to interface said terminal apparatus for voice and digital communication and including means to provide signal values from signals representative of data developed by said terminal apparatus;
  voice generator means coupled through said interface means for actuating said terminal apparatus as to provide vocal operating instructions to an individual caller;
  a sequencer for developing sequence data signals as identification data;
  record means connected to said interface means for initiating a file and storing identification data and statistical digital data for specific callers including data developed by said terminal apparatus; and
  analysis means connected to said record means for processing said statistical data from a plurality of callers in combination to isolate a select subset of said callers by interrelated processing.

22. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:
  interface structure coupled to said communication facility to interface said terminal apparatus for voice and digital communication and including means to provide signal values from signals representative of data developed by said terminal apparatus;
  voice generator means coupled through said interface means for actuating said terminal apparatus as to provide vocal operating instructions to an individual caller;
  a qualification unit for developing qualification data signals as identification data;
  record means connected to said interface means for initiating a file and storing identification data and statistical digital data for specific callers including data developed by said terminal apparatus; and
  analysis means connected to said record means for processing said statistical data from a plurality of callers in combination to isolate a select subset of said callers by interrelated processing.

23. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:
  interface structure coupled to said communication facility to interface said terminal apparatus for voice and digital communication and including means to provide signal values from signals representative of data developed by said terminal apparatus;
  voice generator means coupled through said interface means for actuating said terminal apparatus as to provide vocal operating instructions to an individual caller;
  a designation unit for developing designation data signals as identification data consisting of at least two data elements;
  record means connected to said interface means for initiating a file and storing identification data and statistical digital data for specific callers including data developed by said terminal apparatus; and
  analysis means connected to said record means for processing said statistical data from a plurality of callers in combination to isolate a select subset of said callers by interrelated processing.

24. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:
  interface structure coupled to said communication facility to interface said terminal apparatus for voice and digital communication and including means to provide signal values from signals representative of data developed by said terminal apparatus;
  voice generator means coupled through said interface means for actuating said terminal apparatus as to provide vocal operating instructions to an individual caller;
  a sequencer for developing sequence data signals as identification data;
  a qualification unit for developing qualification data signals as identification data;

a designation unit for developing designation data signals as identification data;

record means connected to said interface means for initiating a file and storing identification data and statistical digital data for specific callers including data developed by said terminal apparatus; and analysis means connected to said record means for processing said statistical data from a plurality of callers in combination to isolate a select subset of said callers by interrelated processing.

25. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:

interface structure coupled to said communication facility to interface said terminal apparatus for voice and digital communication and including means to provide signal values from signals representative of data developed by said terminal apparatus;

voice generator means coupled through said interface means for actuating said terminal apparatus as to provide vocal operating instructions to an individual caller;

record means connected to said interface means for initiating a file and storing identification data and statistical digital data for specific callers including data developed by said terminal apparatus;

analysis means connected to said record means for processing said statistical data from a plurality of callers in combination to isolate a select subset of said callers by interrelated processing; and a qualification unit for controlling access of callers to said analysis means in accordance with the content of said record means.

26. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:

interface structure coupled to said communication facility to interface said terminal apparatus for voice and digital communication and including means to provide signal values from signals representative of data developed by said terminal apparatus;

voice generator means coupled through said interface means for actuating said terminal apparatus as to provide vocal operating instructions to an individual caller;

a designation unit for developing designation data signals as identification data and including an encryptor; and analysis means connected to said record means for processing said statistical data from a plurality of callers in combination to isolate a select subset of said callers by interrelated processing.

27. A statistical analysis system for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said control system comprising:

interface structure coupled to said communication facility to interface said terminal apparatus for voice and digital communication and including means to provide signal values from signals representative of data developed by said terminal apparatus;

voice generator means coupled through said interface means for actuating said terminal apparatus as to provide vocal operating instructions to an individual caller; and analysis means connected for processing data from a plurality of callers in combination to isolate a select subset of said callers by interrelated processing including a random number generator for selecting said subset.

28. A process for statistical analysis of data for use with a communication facility including remote terminal apparatus for individual callers, wherein said remote terminal apparatus may comprise a conventional telephone instrument including voice communication means and digital input means in the form of an array of alphabetic numeric buttons for providing identification and statistical data, said process including the steps of:

interfacing said communication facility to provide voice signals and receive digital identification and answer signals representative respectively of identification data and answer data developed by said terminal apparatus under control of said caller;

generating voice signals and supplying said voice signals to actuate said terminal apparatus, as to provide vocal operating instructions to a caller;

providing sequence signals representative of sequence data indicating the time sequence of a call with reference to the calls from other callers;

qualifying callers based on said digital identification signals;

designating callers based on said digital identification signals;

initiating files and storing data from qualified callers including, (1) answer data for specific callers as indicated by said answer signals, (2) sequence data as indicated by said sequence signals and (3) identification data as indicated by said identification signals;

providing external data signals representative of external data distinct from said answer data provided from said callers; and comparing said answer data from said callers and analyzing said answer data with said external data in combination to isolate a select subset of said callers.

29. A statistical analysis control system for use with a communication facility including remote terminals for individual callers, wherein said remote terminals may comprise a conventional telephone instrument including voice communication means, and digital input means in the form of an array of alphabetic numeric buttons for providing identification and statistical data, said control system comprising:

function unit means for processing data supplied by individual callers at said terminals in accordance with various formats, at least one select of said formats including means for initiating files and storing, (1) answer data from said callers for said select format, (2) sequence data indicating the sequence of callers for said select format and (3) identification data identifying said callers for said select format;

interface means for interfacing said communication facility to said function unit means for voice and digital communication, including means to provide signals representative of digital data developed by said terminals to said function unit means and voice generator means for actuating said terminals to provide vocal communication to individual callers; and call distribution means for coupling a specific caller at a terminal through said interface means to said function unit means for communication and processing of data in accordance with a specific one of said formats.

30. A system according to claim 29 wherein said distribution means includes a multiplicity of inputs for receiving a plurality of calls to be selectively coupled to said function unit means through said interface means in accordance with digital signals provided from said communication facility.

31. A system according to claim 29 wherein said distribution means is responsive to signals generated by said communication system.

32. A system according to claim 29 wherein said distribution means is responsive to signals generated by a caller at a terminal in a digital form.

33. A system according to claim 29 wherein at least one other of said formats includes means for generating acknowledgement data for said individual callers and means for storing said acknowledgement data with said identification data in said function unit means.

34. A system according to claim 29 wherein at least one other of said formats includes means for limiting access from a terminal to said function unit based on signals received through said call distribution means.

35. A system according to claim 34 wherein said means for limiting access comprise means for limiting access on the basis of accesses per interval of time.

36. A system according to claim 29 wherein at least one other of said formats includes means for analyzing data from a plurality of callers in combination to isolate a select subset of said callers by interrelated processing of said answer data.

37. A system according to claim 29 wherein said function unit means includes a loop-up table.

38. A statistical analysis control system for use with a communication facility including remote terminals for individual callers, wherein said remote terminals may comprise a conventional telephone instrument including voice communication means, and digital input means in the form of an array of alphabetic numeric buttons for providing identification and statistical data, said control system comprising:

function unit means for processing data supplied by individual callers at said terminals in accordance with various formats, at least one select of said formats including means for analyzing data from a plurality of callers in combination to isolate a select subset of said callers;

interface means for interfacing said communication facility to said function unit means for voice and digital communication, including means to provide signals representative of digital data developed by said terminals to said function unit means and voice generator means for actuating said terminals to provide vocal communication to individual callers;

call distribution means for coupling a specific caller at a terminal through said interface means to said function unit means for communication and processing of data in accordance with a specific one of said formats further wherein said distribution means includes a multiplicity of inputs for receiving a plurality of calls to be selectively coupled to said function unit means through said interface means in accordance with digital signals provided from said communication facility.

39. A system according to claim 38 wherein said function unit means includes means for initiating files and storing, (1) answer data from said callers for said select format, (2) sequence data indicating the sequence of callers for said select format and (3) identification data identifying said callers for said select format.

40. A system according to claim 38 wherein said call distribution means is responsive to signals generated by said communication system.

41. A system according to claim 38 wherein said call distribution means is responsive to signals generated by a caller at a terminals in a digital form.

* * * * *

UNITED STATES PATENT AND TRADEMARK OFFICE
CERTIFICATE OF CORRECTION

PATENT NO. : 4,845,739

DATED : July 4, 1989

INVENTOR(S) : Ronald A. Katz

It is certified that error appears in the above-identified patent and that said Letters Patent is hereby corrected as shown below:  Title page:

| Column | Line | |
|---|---|---|
| Abstract | last | "contents" should be --contests--; |
| 1 | 10 | after "Analysis" insert --System--; |
| 15 | 57 | "th" should be --the--; |
| 31 | 25 | before "distribution" insert --call--; |
| 31 | 28 | before "distribution" insert --call--; |
| 31 | 40 | "comprise" should be --comprises--; |
| 32 | 2 | "loop" should be --look--; |
| 32 | 23 | after the semicolon, insert --and--; and |
| 32 | 45 | "terminals" should be --terminal--. |

Signed and Sealed this

Nineteenth Day of June, 1990

Attest:

HARRY F. MANBECK, JR.

*Attesting Officer*

*Commissioner of Patents and Trademarks*

Disclaimer 4,845,739—*Ronald A. Katz*, Los Angeles, Calif. TELEPHONIC-INTERFACE STATISTICAL ANALYSIS SYSTEM. Patent dated Jul. 4, 1989. Disclaimer filed Feb. 13, 1991, by the assignee, First Data Resources, Inc.

Hereby enters this disclaimer to claim 3 of said patent.

[ *Official Gazette June 4, 1991* ]